United States Patent
Chen et al.

(10) Patent No.: US 9,107,144 B2
(45) Date of Patent: Aug. 11, 2015

(54) METHOD FOR SEARCHING WIRELESS SIGNAL, MOBILE ELECTRONIC DEVICE USING THE SAME, AND NON-TRANSITORY STORAGE MEDIUM

(71) Applicant: HTC Corporation, Taoyuan County (TW)

(72) Inventors: Ying-Chung Chen, Taoyuan County (TW); Zih-Ci Lin, Taoyuan County (TW); Wei-Chung Yang, Taoyuan County (TW); Chun-Wei Hsu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 197 days.

(21) Appl. No.: 13/868,119

(22) Filed: Apr. 23, 2013

(65) Prior Publication Data

US 2014/0315546 A1 Oct. 23, 2014

(51) Int. Cl.
*H04W 52/02* (2009.01)
*H04W 48/16* (2009.01)

(52) U.S. Cl.
CPC ............ *H04W 48/16* (2013.01); *H04W 52/027* (2013.01); *H04W 52/0225* (2013.01); *H04W 52/0254* (2013.01); *Y02B 60/50* (2013.01)

(58) Field of Classification Search
CPC .............. H04W 48/16; H04W 52/027; H04W 52/0254; H04W 52/0225; Y02B 60/50

USPC ............... 455/414.1, 418–420, 434–435.3, 455/456.1–456.6, 515, 573–574
See application file for complete search history.

(56) References Cited

U.S. PATENT DOCUMENTS

| | | | |
|---|---|---|---|
| 2002/0147024 A1* | 10/2002 | Wan | 455/515 |
| 2009/0209278 A1 | 8/2009 | Narang et al. | |
| 2010/0181988 A1 | 7/2010 | Hong et al. | |
| 2011/0136530 A1* | 6/2011 | Deshpande | 455/515 |
| 2012/0014267 A1 | 1/2012 | Gomes et al. | |
| 2013/0130742 A1* | 5/2013 | Dietz et al. | 455/556.1 |

OTHER PUBLICATIONS

"Office Action of Taiwan Counterpart Application", issued on Oct. 23, 2014, p. 1-p. 8, in which the listed references were cited.

* cited by examiner

*Primary Examiner* — Kashif Siddiqui
(74) *Attorney, Agent, or Firm* — Jianq Chyun IP Office

(57) ABSTRACT

A method for searching wireless signal, a mobile electronic device using the same, and a non-transitory storage medium are provided. In the method, after a motion sensor of the mobile electronic device is activated, a motion status of the mobile electronic device is determined by using the motion sensor. Then, a frequency of the mobile electronic device performing a wireless signal searching procedure is adjusted according to the motion status, so as to reduce power wasted due to the unnecessary wireless signal searching procedure being performed.

15 Claims, 4 Drawing Sheets

|  | First stage | Second stage | Third stage |
|---|---|---|---|
| Screen on | 10 sec./time period | 20 sec./time period | 60 sec./time period |
| Screen off | 30 sec./time period | 60 sec./time period | 120 sec./time period |

METHOD FOR SEARCHING WIRELESS SIGNAL, MOBILE ELECTRONIC DEVICE USING THE SAME, AND NON-TRANSITORY STORAGE MEDIUM

BACKGROUND OF THE INVENTION

1. Field of the Invention

The invention relates to a method for searching signal, and more particularly to a method for searching wireless signal of a mobile electronic device, a mobile electronic device using the same and a non-transitory storage medium.

2. Description of Related Art

With improvement of mobile communication technology, mobile electronic device has become a tool indispensable to people's life nowadays. Take a smart phone as an example, besides functions such as calling, text messaging, web browsing, multi-medium playing and photo taking, the smart phone may further includes functions similar to that of a personal computer, which allows a user to install various applications from a third party provider, so as to add new functions to the smart phone based on actual requirement. However, in comparison with a feature phone, as the new functions being added continuously, a power consumption of a battery in the smart phone may also be substantially increased.

Generally, in case when no available network can be found, the smart phone continuously performs a network searching procedure, and the network searching procedure only stops when an available network is connected. In other words, when being placed in a poor reception area such as in a basement, the smart phone may continuously perform an unnecessary network searching procedure until the power is ran out. Accordingly, besides that no available network can be found, performing said unnecessary network searching procedure in the poor reception area may further speed up the power consumption, resulting a considerable inconvenience for the user.

SUMMARY OF THE INVENTION

The invention is directed to a method for searching wireless signal, a mobile electronic device and a non-transitory storage medium, for adjusting a frequency of performing a wireless signal searching procedure in time, so as to ensure a power-saving effect.

The invention provides a method for searching wireless signal, suitable for a mobile electronic device having a motion sensor. The method includes determining a motion status of the mobile electronic device by using a motion sensor after the motion sensor is activated. The method further includes adjusting a frequency of the mobile electronic device performing a wireless signal searching procedure according to the motion status.

A mobile electronic device according to an embodiment of the invention includes a wireless communication unit, a processing unit and a motion sensor. The processing unit is coupled to the wireless communication unit, and the motion sensor is coupled to the wireless communication unit and/or the processing unit. Among them, the processing unit determines a motion status of the mobile electronic device by using the motion sensor after the motion sensor is activated, and adjusts a frequency of the wireless communication unit performing a wireless signal searching procedure according to the motion status.

The invention provides a non-transitory storage medium for recording at least one program command, the at least one program command is configured to be load in a mobile electronic device having a motion sensor as to perform the following steps. Determining a motion status of the mobile electronic device by using the motion sensor after the motion sensor is activated; and adjusting a frequency of the mobile electronic device performing a wireless signal searching procedure according to the motion status.

Based on above, the invention is capable of lowering a frequency of performing a wireless signal searching procedure when a mobile electronic device is continuously located in a weak signal area or a dead zone where no available network can be found. Accordingly, an unnecessary wireless signal searching procedure performed by the wireless communication unit may be avoided, so as to ensure the power-saving effect.

To make the above features and advantages of the invention more comprehensible, several embodiments accompanied with drawings are described in detail as follows.

DESCRIPTION OF THE EMBODIMENTS

Figure 1:
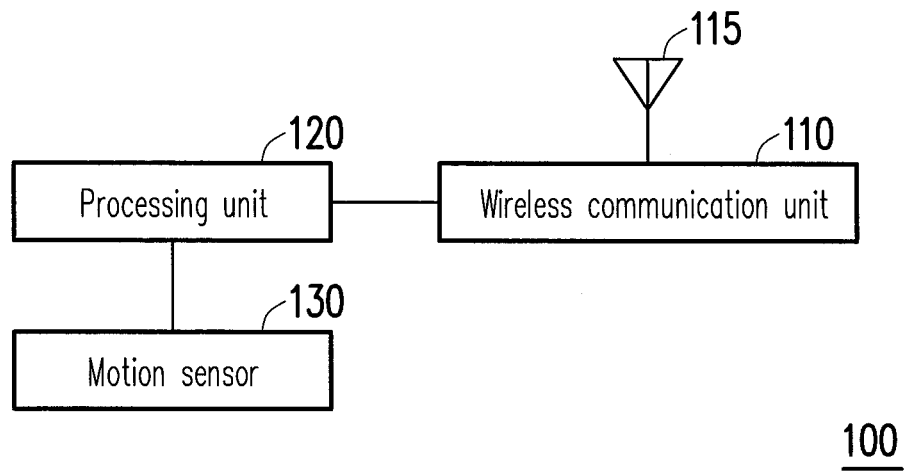
FIG. 1 is a schematic view illustrating a mobile electronic device according to an embodiment of the invention.

FIG. 1 is a schematic view illustrating a mobile electronic device according to an embodiment of the invention. Referring to FIG. 1, a mobile electronic device 100 includes a wireless communication unit 110, a processing unit 120 and a motion sensor 130. The mobile electronic device 100 may be a cellular phone, a smart phone, a personal digital assistant (PDA), a tablet computer, a digital camera, an e-book or a handheld game console, the invention is not limited thereto.

The wireless communication unit 110 includes a radio frequency (RF) chip and a wireless connection chip, and provides a wireless communication feature via an antenna 115. More specifically, the mobile electronic device 100 connects to a mobile communication network and/or a wireless communication network via the wireless communication unit 110. Among them, the mobile communication network includes global system for mobile communication (GSM) network, general packet radio service (GPRS) network code division multiple access (CDMA) network, wideband code division multiple access (WCDMA) network, code division multiple access version 2000 (CDMA2000) network, 3rd-generation (3G) network, and 4th-generation (4G) network. The wireless communication network includes wireless fidelity (Wi-Fi) network, Bluetooth, worldwide interoperability for microwave access (WiMAX) network, global positioning system (GPS), and global navigation satellite system (GLONASS).

The processing unit 120 is coupled to the wireless communication unit 110. Among them, the processing unit 120 may be, for example, a central processing unit (CPU) or other programmable microprocessors, a digital signal processor (DSP), a programmable controller, an application specific integrated circuits (ASIC), a programmable logic device (PLD) or other hardware devices with a computing capability.

The processing unit 120 is configured to control overall operations of the mobile electronic device 100, and to realize each step in the method for searching wireless signal as recited in the invention.

The motion sensor 130 is coupled to the processing unit 120 and configured to sense a motion of the mobile electronic device 100 in space. For instance, the motion sensor 130 may be, for example, a g-sensor, a gyro sensor, a magnetometer or a compass sensor, but the invention is not limited thereto.

Figure 2:
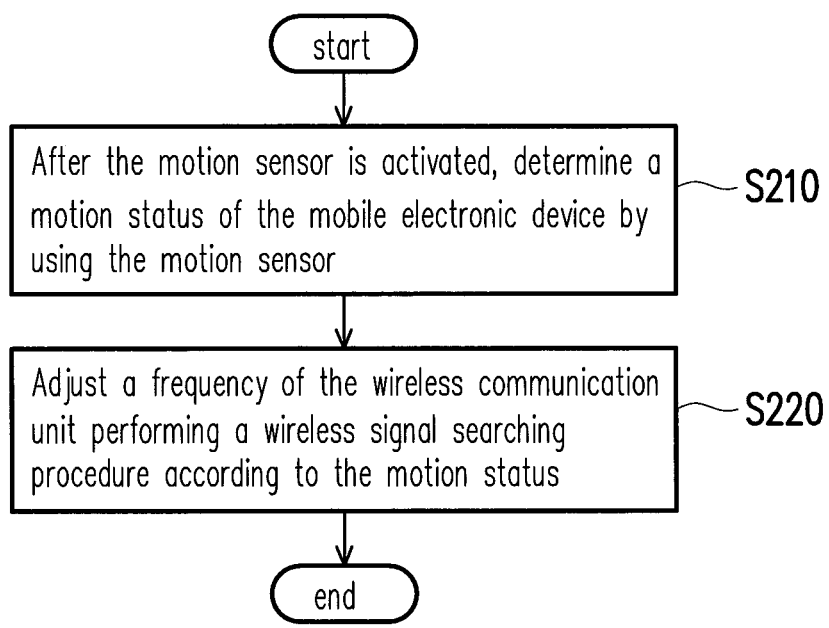
FIG. 2 is a flowchart illustrating a method for searching wireless signal according to an embodiment of the invention.

In order to further describe the operation of the mobile electronic device 100 in detail, another embodiment is illustrated as to further describe the invention. FIG. 2 is a flowchart illustrating a method for searching wireless signal according to an embodiment of the invention. Referring to FIG. 1 and FIG. 2 together.

First, as shown in step S210, after the motion sensor 130 is activated, the processing unit 120 determines a motion status of the mobile electronic device 100 according to a sensing value detected by the motion sensor 130. Therein, the motion status generated by the mobile electronic device 100 may be a steady state and a moving state, and may further be other statuses based on different design concepts, the invention is not limited thereto. For instance, it is assumed that the motion sensor 130 is implemented by using the g-sensor, after being activated, in that case the motion sensor 130 may continuously detect acceleration values (e.g., acceleration values respectively detected at X-axis, Y-axis and Z-axis) of the mobile electronic device 100 in space. The processing unit 120 may compare each of the acceleration values detected by the motion sensor 130 to at least one threshold value, so as to determine whether the motion status of the mobile electronic device 100 is the steady state, the moving state or other statuses. Alternatively, the processing unit 120 may first perform a mathematical calculation to each of the acceleration values detected by the motion sensor 130, and compare a calculation result with a preset threshold value, so as to determine the motion status of the mobile electronic device 100. In other embodiments, the processing unit 120 may maintain a correspondence table for the sensing value and the motion status, and identify the motion status corresponded to the sensing value detected by the motion sensor 130 by checking the correspondence table.

Next in step S220, the processing unit 120 may adjust a frequency of the wireless communication unit 110 performing a wireless signal searching procedure according to the motion status. Therein, performing the wireless signal searching procedure refers to operations of receiving, monitoring or searching (such as a cell search) performed by the wireless communication unit 110 in order to connect the available network when the mobile electronic device 100 is located in a weak signal area (or a no signal area), but the invention is not limited thereto. In the present embodiment, when the mobile electronic device 100 is in a specific motion status, the processing unit 120 may control the wireless communication unit 110 to perform the wireless signal searching procedure with the frequency corresponded to said specific motion status.

As shown in FIG. 2, the processing unit 120 determines the frequency of the wireless communication unit 110 performing the wireless signal searching procedure according to the sensing value detected by the motion sensor 130, such that the frequency of performing the wireless signal searching procedure may be lowered when the mobile electronic device 100 is in the motion status which does not require the wireless signal searching procedure to be performed frequently, so as to ensure a power-saving effect.

In the following embodiments, other than that the processing unit 120 performs adjustment according to the sensing value detected by the motion sensor 130, the frequency of the wireless communication unit 110 performing the wireless signal searching procedure is further adjusted in time with reference to whether the mobile electronic device 100 is located in the weak signal area.

Figure 3:
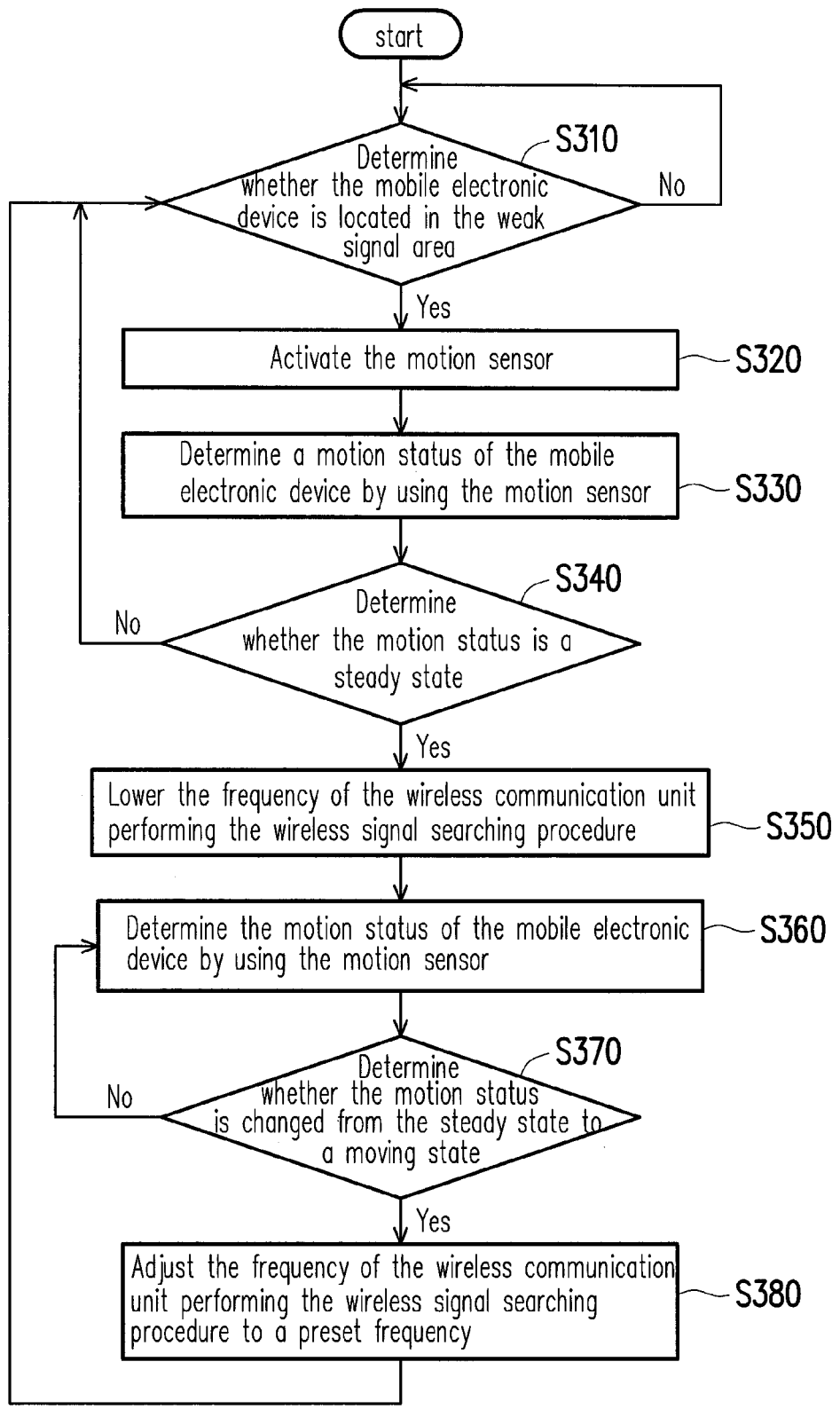
FIG. 3 is a flowchart illustrating the method for searching wireless signal according to another embodiment of the invention.

FIG. 3 is a flowchart illustrating the method for searching wireless signal according to another embodiment of the invention. Referring to FIG. 1 and FIG. 3 together.

First in step S310, the processing unit 120 determines whether the mobile electronic device 100 is located in the weak signal area according to a signal strength received by the wireless communication unit 110. More specifically, the weak signal area may be, for example, a dead zone where no available network can be found by the wireless communication unit 110 or areas where the wireless signal received is too weak to use. Generally, whether the wireless signal is weak may be determined by a wireless signal strength information being received, in which the wireless signal strength information may be, for example, a received signal strength indication (RSSI), or a signal to noise ratio (S/N). However, the invention is not limited thereto, and a method for determining whether the wireless signal being weak is neither limited to the above. When the mobile electronic device 100 is not located in the weak signal area, the determination of step S310 in the method for searching wireless signal disclosed of the present embodiment is repeatedly performed.

When the mobile electronic device 100 is located in the weak signal area, the processing unit 120 activates the motion sensor 130, as shown in step S320. That is to say, in the present step, the processing unit 120 ensures that the motion sensor 130 is being activated. After being activated, the motion sensor 130 may continuously detect the sensing value corresponded to the motion status of the mobile electronic device 100.

Next, the processing unit 120 determines the motion status of the mobile electronic device 100 by using the motion sensor 130 in step S330, and determines whether the motion status is the steady state in step S340. For instance, the processing unit 120 identifies the motion status as the steady state when the sensing value detected by the motion sensor 130 is smaller than a threshold value, and identifies the motion status as the moving state when the sensing value detected by the motion sensor 130 is greater than or equal to the threshold value. It is assumed that the motion sensor 130 is implemented by using the g-sensor, and the accelerations values detected at X-axis, Y-axis and Z-axis by the motion sensor 130 are respectively fall within a range of 0 to 9.8. If the threshold value is 0.1, when the acceleration values of said three axises are all smaller than 0.1, the processing unit 120 identifies the motion status as the steady state. However, when at least one of the acceleration values of said three axises is greater than or equal to 0.1, the processing unit 120 identifies the motion status as the moving state.

When the motion status is not the steady state, which means that the mobile electronic device 100 is still on the move and likely to leave the weak signal area. In this case, returning back to step S310 in the method for searching wireless signal of the present embodiment, in which whether the mobile electronic device 100 is located in the weak signal area is re-determined, so that the processing unit 120 may continue to determine the motion status of the mobile electronic device 100 by using the motion sensor 130.

However, if a determination result of step S340 is positive, it indicates that the mobile electronic device 100 stably and continuously remains in the weak signal area where no available network can be found, proceeding to step S350, in which the processing unit 120 lowers the frequency of the wireless communication unit 110 performing the wireless signal searching procedure. Several embodiments are exemplified hereinafter to describe a method for lowering the frequency of performing the wireless signal searching procedure.

According to an embodiment, the processing unit 120 may directly forbid the wireless communication unit 110 from performing the wireless signal searching procedure. That is, once the mobile electronic device 100 is in the steady state and continuously located in the weak signal area, the wireless communication unit 110 will not perform any wireless signal searching procedure.

According to another embodiment, it is assumed that when the mobile electronic device 100 is not located in the weak signal area, the wireless communication unit 110 performs the wireless signal searching procedure every a first specific time period. When the processing unit 120 lowers the frequency of the wireless communication unit 110 performing the wireless signal searching procedure, the processing unit 120 controls the wireless communication unit 110 to perform the wireless signal searching procedure every a second specific time period. Therein, the second specific time period is longer than the first specific time period. In other words, based on instructions from the processing unit 120, a time interval of the wireless communication unit 110 performing the wireless signal searching procedure is extended while the mobile electronic device 100 is in the steady state and continuously located in the weak signal area, so as to lower a number of times for performing the wireless signal searching procedure.

Figures 4, 5:
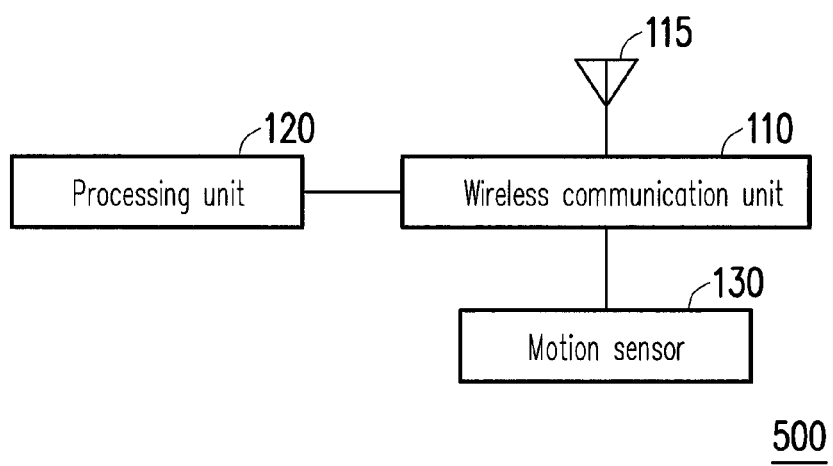
FIG. 4 is a time period adjustment table according to an embodiment of the invention.
FIGS. 5 to 7 are schematic views illustrating the mobile electronic device according to other embodiments of the invention.

According to yet another embodiment, the processing unit 120 lowers the frequency of the wireless communication unit 110 performing the wireless signal searching procedure by gradually extending a length of a time period for the wireless communication unit 110 to perform the wireless signal searching procedure, in which the length of the time period to be extended each time is longer than the first specific time period. FIG. 4 is a time period adjustment table according to an embodiment of the invention. In the present embodiment, after a command for lowering the frequency issued by the processing unit 120 is received by the wireless communication unit 110, the length of the time period for the wireless communication unit 110 to perform the wireless signal searching procedure may be extended according to the time period adjustment table depicted in FIG. 4. For instance, the first 20 time periods (i.e., the first time period to the twentieth time period) after the command for lowering the frequency received by the wireless communication unit 110 are referred to as a first stage, whereas the following 20 periods (i.e., the twenty-first time period to the fortieth time period) are referred to as a second stage, and the rest of time periods are all referred to as a third stage. The wireless communication unit 110 utilizes different lengths of the time periods for different stages based on whether a screen of the mobile electronic device 100 is turned on or off. It is assumed that the wireless communication unit 110 performs the wireless signal searching procedure every 5 seconds when the mobile electronic device 100 is not located in the weak signal area (i.e., the first specific time period is 5 seconds). Take the status marked as "screen on" as an example, in which the length of each time period in the first stage is 10 seconds, the length of each time period in the second stage is 20 seconds, and the length of each time period in the third stage is 60 seconds. The, length of the time period in each of said stages is longer than the first specific time period. It should be noted that, above-said method for dividing the stages is merely an example for illustrating the description, the length of the time period in each stage and a number of the stage are not limited thereto, any method which can be used for gradually extending the length of the time period for the wireless communication unit 110 to perform the wireless signal searching procedure falls in the protection scope of the invention.

Referring back to step S360 depicted in FIG. 3, the processing unit 120 again determines the motion status of the mobile electronic device 100 by using the motion sensor 130, and determines whether the motion status is changed from the steady state to the moving state, as shown in step S370. If the motion status is still in the steady state, which means that the mobile electronic device 100 is still located in the weak signal area, then returning back to step S360 in the method for searching wireless signal, so that the processing unit 120 may continue to determine the motion status of the mobile electronic device 100.

However, when the motion status of the mobile electronic device 100 is changed from the steady state to the moving state, which indicates that the mobile electronic device is likely to leave the weak signal area at this instance. Therefore, as shown in step S380, the processing unit 120 may adjust the frequency of the wireless communication unit 110 performing the wireless signal searching procedure to the preset frequency. That is, the wireless communication unit 110 is controlled to perform the wireless signal searching procedure every a first specific time period.

Next, returning back to step S310 in the method for searching wireless signal, and when the mobile electronic device 100 enters the weak signal area again, proceeding to step S320 to step S380.

According to the embodiment depicted in FIG. 3, when the mobile electronic device 100 is located in the weak signal area, the processing unit 120 controls the wireless communication unit 110 to perform the wireless signal searching procedure with a lower frequency, or even not to perform the wireless signal searching procedure. Up until it is determined that the mobile electronic device 100 is likely to leave the weak signal area, the processing unit 120 may again control the wireless communication unit 110 to restore the preset frequency for performing the wireless signal searching procedure. In other words, the processing unit 120 may dynamically adjust the frequency of the wireless communication unit 110 performing the wireless signal searching procedure based on the information provided by motion sensor 130. Accordingly, an unnecessary wireless signal searching procedure performed by the wireless communication unit 110 may be avoided when the mobile electronic device 100 is continuously located in the weak signal area, so as to reduce power consumption at this instance.

Figure 6:
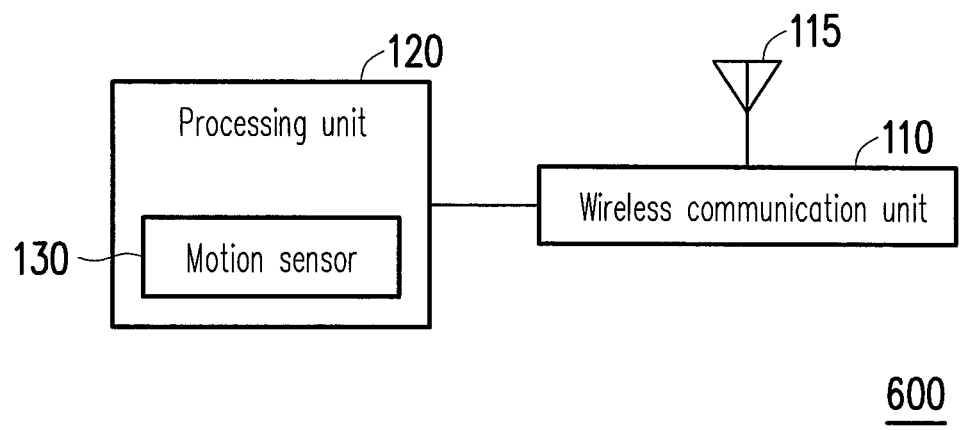
Figure 7:
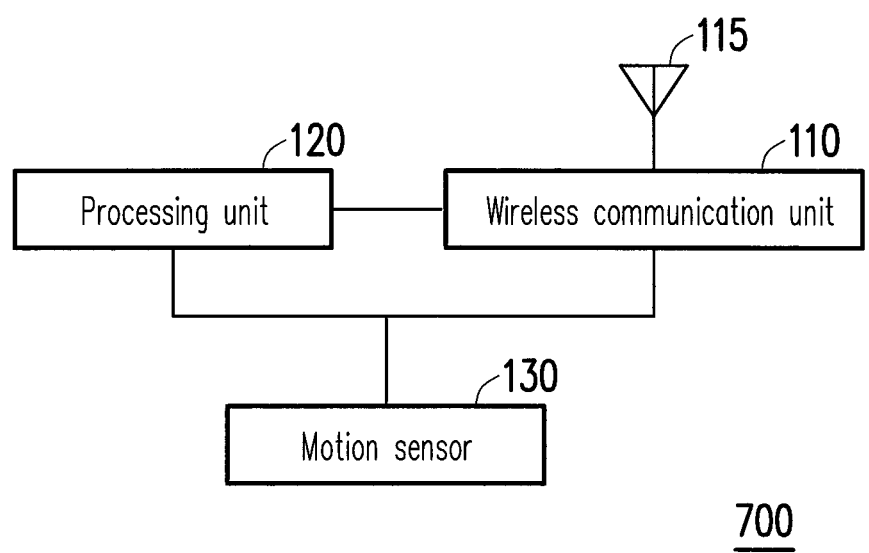

FIGS. 5 to 7 are schematic views illustrating the mobile electronic device according to other embodiments of the invention. Only description to coupling relations differ to the previous embodiment is discussed hereinafter.

Referring to FIG. 5, a mobile electronic device 500 includes the wireless communication unit 110, the antenna 115, the processing unit 120 and the motion sensor 130. Among them, the antenna 115, the processing unit 120 and the motion sensor 130 are respectively coupled to the wireless communication unit 110.

Referring to FIG. 6, a mobile electronic device 600 includes the wireless communication unit 110, the antenna 115, the processing unit 120 and the motion sensor 130. Among them, the processing unit 120 is coupled to the wireless communication unit 110, whereas the motion sensor 130 is built-in to the processing unit 120.

Referring to FIG. 7, a mobile electronic device 700 includes the wireless communication unit 110, the antenna 115, the processing unit 120 and the motion sensor 130. Among them, the processing unit 120 is coupled to the wireless communication unit 110, whereas the motion sensor 130 is coupled to the processing unit 120 and the wireless communication unit 110, respectively.

In the embodiments as depicted in FIG. 5 to FIG. 7, the mobile electronic devices 500, 600 and 700 may all realize an effect identical or similar to that of the mobile electronic device 100 depicted in FIG. 1, in which same or similar reference numerals used in the present embodiment represent the same or similar elements, thus related description is omitted hereinafter.

From another aspect, the embodiment of the invention further provides a non-transitory storage medium. Said non-transitory storage medium records at least one program command or program code. The at least one program command or program code is configured to be loaded into a mobile electronic device having a motion sensor and to perform said steps described in each of above embodiments.

For instance, after the at least one program command or program code is loaded into the mobile electronic device 100 depicted in FIG. 1 (or the mobile electronic devices 500, 600 and 700 respective illustrated in FIGS. 5 to 7), the processing unit 120 executes the at least one program command or program code, so as to perform each step mentioned in the method for searching wireless signal as depicted in FIG. 2 and/or FIG. 3. In the present embodiment, examples of the non-transitory storage medium may include a read-only memory (ROM), a random-access memory (RAM), a CD-ROM, a magnetic tape, a floppy disk and an optical data storage device.

In view of above, the method for searching wireless signal, the mobile electronic device and the non-transitory storage medium of the invention adjust a frequency of the mobile electronic device performing a wireless signal searching procedure according to the motion status of the mobile electronic device, so as to ensure the power-saving effect.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A method for searching wireless signal, suitable for a mobile electronic device having a motion sensor, comprising:
   determining whether the mobile electronic device is located in a weak signal area;
   in response to the mobile electronic device determined to be located in the weak signal area, activating the motion sensor and determining a motion status of the mobile electronic device by using the motion sensor; and
   adjusting a frequency of the mobile electronic device performing a wireless signal searching procedure according to the motion status.

2. The method for searching wireless signal of claim 1, wherein the step of adjusting the frequency of the mobile electronic device performing the wireless signal searching procedure according to the motion status comprises:
   lowering the frequency of the mobile electronic device performing the wireless signal searching procedure when the motion status is a steady state and the mobile electronic device is located in a weak signal area;
   determining the motion status of the mobile electronic device by using the motion sensor continuously; and
   adjusting the frequency of the mobile electronic device performing the wireless signal searching procedure to a preset frequency when the motion status is changed from the steady state to a moving state, wherein the mobile electronic device performs the wireless signal searching procedure every a first specific time period when the frequency is adjusted to be the preset frequency.

3. The method for searching wireless signal of claim 2, wherein the step of lowering the frequency of the mobile electronic device performing the wireless signal searching procedure comprises:
   forbidding the mobile electronic device from performing the wireless signal searching procedure.

4. The method for searching wireless signal of claim 2, wherein the step of lowering the frequency of the mobile electronic device performing the wireless signal searching procedure comprises:
   controlling the mobile electronic device to perform the wireless signal searching procedure every a second specific time period, wherein the second specific time period is longer than the first specific time period.

5. The method for searching wireless signal of claim 2, wherein the step of lowering the frequency of the mobile electronic device performing the wireless signal searching procedure comprises:
   gradually extending a length of a time period for the mobile electronic device to perform the wireless signal searching procedure, wherein the length of the time period to be extended each time is longer than the first specific time period.

6. The method for searching wireless signal of claim 2, further comprising:
   identifying the motion status as the steady state when a sensing value detected by the motion sensor is smaller than a threshold value; and
   identifying the motion status as the moving state when the sensing value detected by the motion sensor is greater than or equal to the threshold value.

7. A mobile electronic device comprising:
   a wireless communication unit;
   a processing unit coupled to the wireless communication unit; and
   a motion sensor coupled to at least one of the wireless communication unit and the processing unit,
   wherein the processing unit determines whether the mobile electronic device is located in a weak signal area, activates the motion sensor in response to the mobile electronic device determined to be located in the weak signal area, determines a motion status of the mobile electronic device by using the motion sensor, and adjusts a frequency of the wireless communication unit performing a wireless signal searching procedure according to the motion status.

8. The mobile electronic device of claim 7, wherein the processing unit lowers the frequency of the wireless communication unit performing the wireless signal searching procedure when the motion status is a steady state and the mobile electronic device is located in the weak signal area, determines the motion status of the mobile electronic device by using the motion sensor continuously, and adjust the frequency of the wireless communication unit performing the wireless signal searching procedure to a preset frequency when the motion status is changed from the steady state to a moving state, wherein the wireless communication unit performs the wireless signal searching procedure every a first specific time period when the frequency is adjusted to be the preset frequency.

9. The mobile electronic device of claim 8, wherein the processing unit lowers the frequency of the wireless communication unit performing the wireless signal searching procedure by forbidding the wireless communication unit from performing the wireless signal searching procedure.

10. The mobile electronic device of claim 8, wherein the processing unit lowers the frequency of the wireless communication unit performing the wireless signal searching procedure by controlling the wireless communication unit to perform the wireless signal searching procedure every a second specific time period, wherein the second specific time period is longer than the first specific time period.

11. The mobile electronic device of claim 8, wherein the processing unit lowers the frequency of the wireless communication unit performing the wireless signal searching procedure by gradually extending a length of a time period for the wireless communication unit to perform the wireless signal searching procedure, wherein the length of the time period to be extended each time is longer than the first specific time period.

12. The mobile electronic device of claim 8, wherein the processing unit identifies the motion status as the steady state when a sensing value detected by the motion sensor is smaller than a threshold value, and identifies the motion status as the moving state when the sensing value detected by the motion sensor is greater than or equal to the threshold value.

13. A non-transitory storage medium recording at least one program command, the at least one program command is configured to be loaded into a mobile electronic device having a motion sensor as to perform following steps:
 determining whether the mobile electronic device is located in a weak signal area;
 in response to the mobile electronic device determined to be located in the weak signal area, activating the motion sensor and determining a motion status of the mobile electronic device by using the motion sensor; and
 adjusting a frequency of the mobile electronic device performing a wireless signal searching procedure according to the motion status.

14. The method for searching wireless signal of claim 1, wherein the weak signal area is a no signal area.

15. The mobile electronic device of claim 7, wherein the weak signal area is a no signal area.

* * * * *